United States Patent [19]

Houman et al.

[11] Patent Number: 4,654,499

[45] Date of Patent: Mar. 31, 1987

[54] EDM ELECTRODE ASSEMBLY AND METHOD OF MAKING AND USING SAME

[75] Inventors: Leif Houman, Oyster Bay; Leonard M. Wohlabaugh, Miller Place, both of N.Y.

[73] Assignee: Xermac, Inc., Royal Oak, Mich.

[21] Appl. No.: 735,626

[22] Filed: May 20, 1985

[51] Int. Cl.⁴ .......................... B23H 7/30; B23H 1/04
[52] U.S. Cl. ................. 219/69 G; 204/129.5; 204/286; 219/69 E
[58] Field of Search ............... 219/69 M, 69 E, 69 V, 219/69 G, 69 R; 204/129.5, 286, 280, 297 R, 224 M

[56] References Cited

U.S. PATENT DOCUMENTS

| | | | |
|---|---|---|---|
| 2,818,491 | 12/1957 | Matulaitis | 219/69 G |
| 3,051,638 | 8/1962 | Clifford et al. | 219/69 E |
| 3,087,043 | 4/1963 | Hofer | 219/69 E |
| 3,272,731 | 9/1966 | Hutchinson et al. | 204/280 |
| 3,306,838 | 2/1967 | Johnson | 204/224 M |
| 3,314,875 | 4/1967 | Andrews | 204/224 M |
| 3,436,331 | 4/1969 | Dietz et al. | 204/224 M |
| 3,467,592 | 9/1969 | Eisberg, Jr. et al. | 219/69 E |
| 3,604,883 | 9/1971 | Dietz | 219/69 E |
| 3,609,279 | 9/1971 | Giesbrecht | 219/69 E |
| 3,614,371 | 10/1971 | Simpkins | 219/69 G |
| 3,622,735 | 11/1971 | Mainwaring | 219/69 E |
| 3,642,601 | 2/1972 | Kondo | 204/286 |
| 3,718,571 | 2/1973 | Bidwell | 204/286 |
| 3,746,827 | 7/1973 | Martin et al. | 219/69 E |
| 4,013,862 | 3/1977 | O'Connor | 219/69 E |
| 4,039,417 | 8/1977 | Sasaki et al. | 204/286 |
| 4,111,781 | 9/1978 | Smith et al. | 204/280 |
| 4,374,313 | 2/1983 | Mateja et al. | 219/69 E |
| 4,553,014 | 11/1985 | Culbreth | 219/138 |

FOREIGN PATENT DOCUMENTS

| | | | |
|---|---|---|---|
| 2019903 | 11/1971 | Fed. Rep. of Germany | 219/69 G |
| 138545 | 8/1982 | Japan | 219/69 E |
| 171219 | 10/1983 | Japan | 219/69 E |
| 59-97815 | 6/1984 | Japan | 219/69 G |
| 83/00453 | 2/1983 | PCT Int'l Appl. | 219/69 G |

*Primary Examiner*—A. D. Pellinen
*Assistant Examiner*—Geoffrey S. Evans
*Attorney, Agent, or Firm*—Brooks & Kushman

[57] ABSTRACT

An EDM electrode assembly including an electrode with a relative uniform, other-than-round shape, in cross-section along its entire length is supported within tubing by an epoxy bushing formed completely around an end portion of the electrode on one end of the tubing to slidably support the electrode. An EDM cartridge assembly constructed in accordance with the above further includes an outer tubing and a mechanism for driving the electrode through the bushing. A method for making the EDM electrode assembly as well as a method of refeeding the electrode.

10 Claims, 7 Drawing Figures

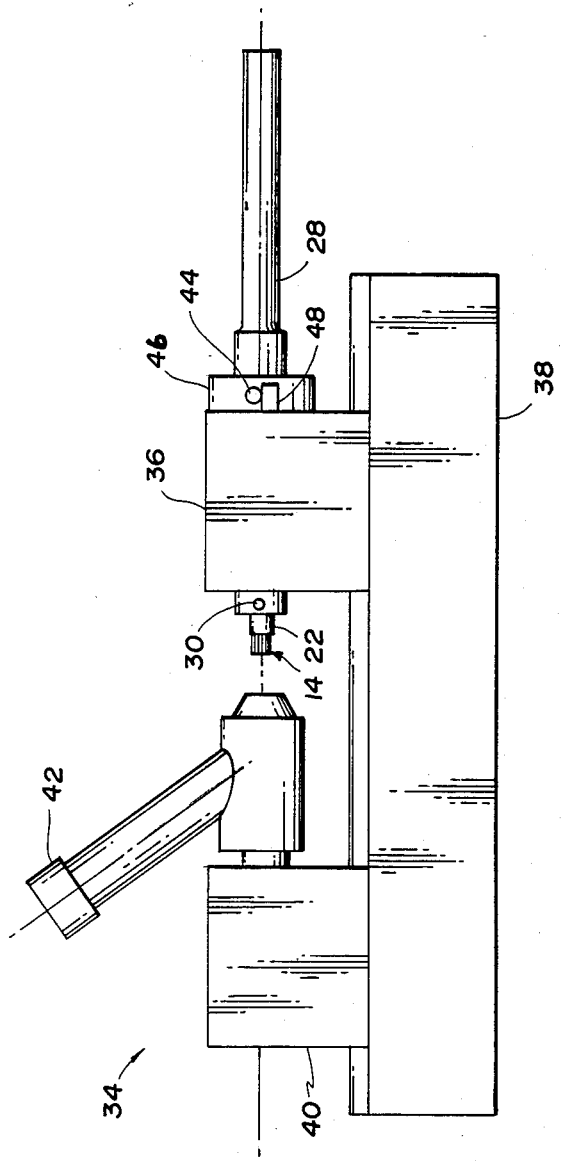
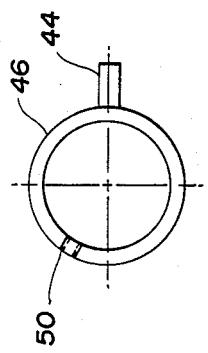
Fig. 6
Fig. 7

EDM ELECTRODE ASSEMBLY AND METHOD OF MAKING AND USING SAME

TECHNICAL FIELD

This invention relates to EDM electrode assemblies and method of making and using same and, in particular, to EDM electrode assemblies including an electrode having an other-than-round shape and method of making and using same.

BACKGROUND ART

Instrumentation, air pollution abatement equipment, scientific instruments, medical devices such as needles and implants, fuel injection nozzles, spinnerettes and gas escapement orifices are some of the products that require extremely small holes, including those holes with other-than-round shapes. Diesel fuel injectors require holes between 0.005 and 0.010 inches in diameter.

The traditional method of small hole drilling involves a drill bit that is subject to easy breakage, and a sensitive drill press in the hands of a skilled operator. The cost is usually high with broken drills and scrapped parts. If the workpiece is a hardened metal, the problems are compounded.

Electric discharge machining (EDM) has been employed from time to time in the drilling of small diameter holes. EDM has worked to a degree even though the results are usually far from optimum since most EDM equipment is designed to handle work on a much larger scale. Amperages, spark frequencies and overcuts that are ideal for machining a die segment, leave much to be desired in the task of drilling a fine, accurate hole with no appreciable layer of recast and solidified material on the hole surface.

EDM, however, still offers numerous advantages in the drilling of small diameter holes. One such advantage is that the hardness of the workpiece to be drilled is irrelevant as long the material is electrically conductive and a spark can be forced to jump from an electrode to the workpiece. The rate of metal removal is a function of electrical conductivity and thermal characteristics of the workpiece. While extremely hard materials sometimes have a higher melting temperature, it is the melting temperature, not the hardness, that is the governing factor.

On the other hand, if the workpiece has no electric conductivity, the EDM process cannot be used. However, all metals and metallic alloys are electrically conductive to some degree and yield to the controlled cascade of sparks.

Another advantage of the EDM process is that when properly controlled, the EDM hole drilling process is very accurate and has a high degree of stability. Because there is no direct contact between the electrode and the workpiece, there are no mechanical forces of the type found in conventional drilling. In small hole work, there is frequently not even a flow of dielectric fluid into the gap area to set up mechanical forces. The energy utilized in the actual metal removal process is divided into a very high frequency sparks which are closely controlled with electronic systems now available.

With the EDM process there is no undue heat generation or any significant mechanical forces involved. Consequently, there is no part distortion. As a result, extremely thin and/or fragile parts can be successfully drilled with the EDM process.

Also, once the EDM job is set up, it can be completely cycled in an automatic fashion. As a result, skilled operators are not required.

The tool cost per hole is also extremely low. To drill holes under 0.015 inches in diameter, a tungsten alloy wire electrode which comes in spools is used. For sizes over 0.015 inches, straight rods are usually used. By way of example, typically hundreds of dollars of tungsten alloy wire will furnish enough electrode material to drill millions of holes in diesel fuel injector nozzles.

Still another advantage of the EDM process is the ability to vary the hole diameter within a limited range by simply changing current parameters without changing the electrode itself. By contrast, the diameter of mechanically drilled holes is determined by the diameter of the cutting tool. In order to resize the holes the size of the tool must be changed or a secondary operation must be performed. In EDM there is always an overcut comprising the spark gap between the electrode and the workpiece. The gap is a direct function of current flow and the frequency with which it is applied. In particular, the higher the current flow or the lower the frequency of sparking, the greater the gap. On normal EDM work, the gap may be anywhere from 0.0001 to 0.0003 inches on a side. Thus, in hole drilling work, the hole diameter is always larger than the tool itself. In small hole work the overcut is relatively small, but it can be closely controlled.

There are no burrs on the holes produced by the EDM process. Metal is eroded away in very minute globules to leave a non-directional type of surface finish. In the amperage and frequency ranges utilized in small hole EDM drilling, a recast surface is virtually non-existent.

The EDM process is also particularly susceptible to the use of the multiple lead principle to drill a number of holes simultaneously. While there are certain limitations that come about from the shape of the workpiece, the distance between the centers of holes and so on, the EDM process saves time.

In general, the EDM process affects many areas of cost saving, including direct tool cost and net machining time by a reduction of workpiece loss due to drill breakage.

Designers have discovered that better gas mixtures will be developed in certain instances where the orifices are made in other-than-round shapes. The common household gas range seems to give a better gas/air mixture if the gases are passed through a rectangular burner portion. Rectangular electrode materials can be utilized in EDM hole drilling units to generate "other-than-round" holes in workpieces. The same technique can be used to generate a "star" or other unusual hole shape if an electrode with the desired shape could be developed and utilized in a simple, yet cost-effective manner.

One method currently being used is to solder or otherwise fixedly attach an other-than-round electrode at one end of a round elongated shaft. However, this approach has many drawbacks, including the drawback of having to frequently change the electrode during the hole-forming process.

DISCLOSURE OF THE INVENTION

An object of the present invention is to provide an electrode assembly and method of making and using same wherein the assembly includes an elongated electrode having a relatively uniform, other-than-round shape is cross-section along its entire length and wherein the electrode is supported within tubing by a bushing formed completely around the end portion of the electrode on one end of the tubing, so that the electrode is slidably supported by the bushing.

Yet another object of the present invention is to provide an EDM electrode assembly and method of making and using same wherein the electrode has a relatively uniform, other-than-round shape in cross-section along its entire length and which is supported within tubing having an inner diameter slightly greater than the diameter of the smallest circle enveloping all of the points of the cross-sectional shape, and wherein a bushing is completely formed around the end portion of the electrode on the one end of the tubing so that the electrode is slidably supported by the bushing.

In carrying out the above objects and other objects of the present invention, a method of making an EDM electrode assembly including an elongated electrode having a relatively uniform, other-than-round shape in cross-section along its entire length includes the step of supporting the electrode in tubing having an inner diameter slightly greater than the diameter of the smallest circle enveloping all the points of the cross-sectional shapes so that an end portion of the electrode extends beyond one end of the tubing. The method also includes the step of forming a bushing completely around the end portion of the electrode on the one end of the tubing so that the electrode is slidably supported by the bushing.

Further in carrying out the above objects and other objects of the present invention, a method is provided for refeeding an elongated EDM electrode having a relatively uniform other-than-round shape in cross-section along its entire length through tubing having an inner diameter greater than the diameter of a circle enveloping all of the points of the cross-sectional shape. The method comprises the step of supporting a rod in the tubing so that the rod is aligned with the electrode and in engagement therewith at one end thereof. The method also includes the steps of driving the rod against the electrode so as to move the electrode along its longitudinal length and guiding the electrode at the one end of the tubing during the step of driving.

An EDM electrode assembly constructed in accordance with the present invention includes an electrode having a relatively uniform, other-than-round shape in cross-section along its entire length. The assembly also includes tubing having an inner diameter greater than the diameter of the circle enveloping all of the points of the cross-sectional shape so that the electrode is supported within the tubing and so that an end portion of the electrode extends beyond one end of the tubing. A bushing is formed completely around the end portion of the electrode on the one end of the tubing to slidably support the electrode.

An EDM cartridge assembly constructed in accordance with the above includes such an electrode assembly and outer tubing which supports the tubing therewith. Means are also provided for driving the electrode through the bushing.

The advantages of such assemblies and method of making and using same are numerous. For example, the cross-sectional shape of the electrode can assume a number of different configurations. Also, the electrode can be extruded in a continuous fashion to lower the costs associated with the electrode.

The objects, features and advantages of the present invention are readily apparent from the following description of the best mode for carrying out the invention taken in connection with the accompanying drawings.

BRIEF DESCRIPTION OF THE DRAWINGS

FIG. 6 is a side view of the structure of FIG. 5 and apparatus for centering the electrode therewithin; and FIG. 7 is an end view of a pin ring useful in the centering operation illustrated in FIG. 6.

BEST MODE FOR CARRYING OUT THE INVENTION

Figure 1:
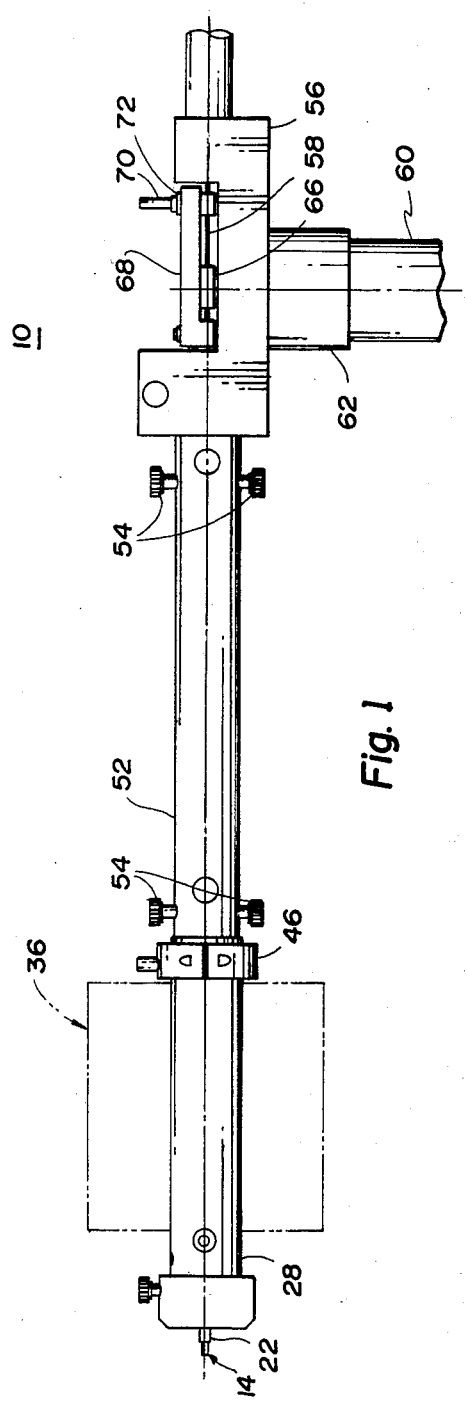
FIG. 1 is a partially broken away side elevational view, illustrating a refeed cartridge assembly, constructed and utilized in accordance with the present invention.
Figure 2:
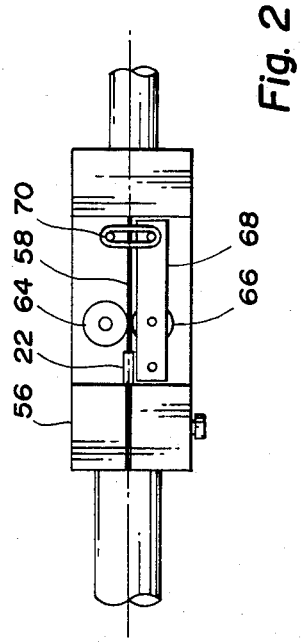
FIG. 2 is a top plan view, partially broken away, of a portion of the cartridge assembly of FIG. 1.
Figure 3:
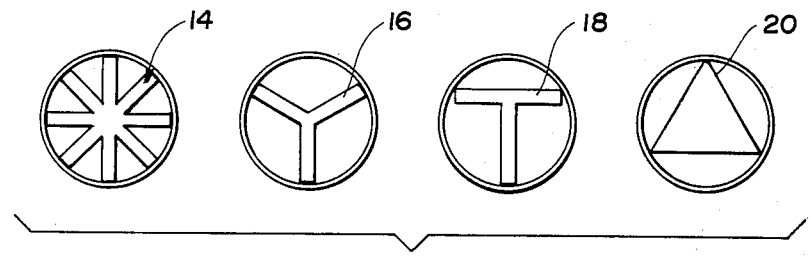
FIG. 3 is an end view of a number of other-than-round shaped electrodes disposed within tubing that can be used in accordance with the present invention.
Figure 4:
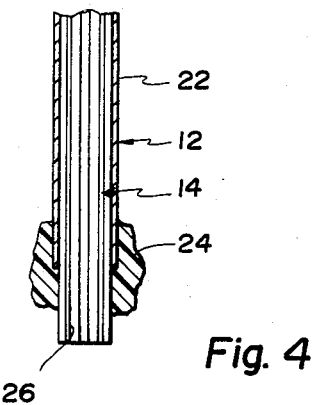
FIG. 4 is a side view, partially broken away and in cross-section, of an electrode assembly constructed in accordance with the present invention.

Referring now to the drawings, there is illustrated in FIGS. 1 and 2, a refeed cartridge assembly, collectively indicated at 10, for refeeding an other-than-round electrode. The refeed cartridge assembly 10 includes an inner electrode assembly, generally indicated at 12 in FIGS. 4 and 5. The electrode assembly 12 includes an extruded, other-than-round electrode, examples of which are shown in FIG. 3 such as a star-shaped electrode, generally indicated at 14, a Y-shaped electrode 16, a T-shaped electrode 18 and a triangular electrode 20. Preferably, the electrode 14 is supported within a length of hypodermic stainless steel tubing 22 having an inner diameter approximately 0.001 inches larger than the minimum circle enveloping all the points of the extruded electrode 14. An epoxy bushing 24 is formed around an end portion 26 of the electrode 14 and on one end of the tubing 22 so as to slidably support the electrode 14 on the tubing 22.

The epoxy bushing 24 is formed by first dipping an end portion 26 of the electrode 14 in a release agent such as silicon. Excess release agent is removed and the remaining release agent is allowed to dry. Then the epoxy is placed around the electrode 14 and the tubing 22 and allowed to dry. The release agent allows the electrode 14 to be slidably supported within the epoxy bushing 24.

Figure 5:
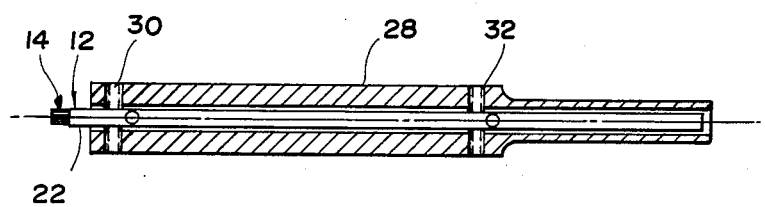
FIG. 5 is a cross-sectional side view of the electrode assembly of FIG. 4 disposed within outer tubing.

When an electrode assembly has to be changed after machining a number of holes in a workpiece, it is of utmost importance that the replacement electrode assembly be placed in exactly the same center and in the same angular position as the original electrode assembly. In order to facilitate this and for the purposes of illustration, the electrode assembly 12 is positioned and supported within outer tubing 28 as shown in FIG. 5. The outer tubing 28 is secured to the inner tubing 22 by four set screws (not shown) at two spaced-apart locations 30 and 32.

In order to center the electrode 14 and the tubing 22 within the outer tubing 28, centering apparatus, generally indicated at 34 in FIG. 6 is utilized. The centering apparatus 34 includes a dovetailed, internally apertured mini block 36 which has a built-in hydraulic clamp holder for holding the outer tubing 28. The mini block 36 is mounted on a dovetailed tooling base 38 which also supports a second mini block 40 which, in turn, supports, a centering microscope 42. Each of the mini blocks 36 and 40, the tool base 38 and the centering microscope 42 are commercially available from the System 3-R Corporation located in Sweden.

The set screws on the outer tubing 28 are adjusted by watching the cross-hairs and concentric circles in the microscope 42 until the electrode 14 is centered. The outer tubing 28 is then rotated until the reference points on the electrode 14 line up with the cross-hairs. A pin 44 on a pin ring 46 mounted on the outer tubing 28 is then rotated to a pin 48 on the mini block 36 and thereafter the pin ring 46 is fastened to the outer tubing 28 by a set screw (not shown) at location 50. The mini block 56 and the outer tubing 28 are thereafter removed from the tooling base 38 to form part of the refeed cartridge assembly 10 as shown in FIG. 1. The dovetailed mini block 36 allows the entire cartridge assembly 10 to be received and retained on a servo slide mechanism (not shown) having a male dovetail.

The outer tubing 28 is centered within tubing 52 of the cartridge assembly 10 by set screws 54. In turn, the tubing 54 is connected to an internally-apertured U-shaped block 56. The outer tubing 22 extends through the tubing 54 into one leg of the U-shaped block 56. A push rod 58 extends into the outer tubing 22 and in driving engagement with the opposite end of the electrode 14.

The push rod 58 is driven by a DC motor 60 through a gear reducer 62 to drive a friction wheel 64 mounted on the drive shaft of the gear reducer 62. The push rod 58 is driven between the friction wheel 64 and an idler wheel 66 rotatably mounted on a block 68 pivotally mounted on the base of the U-shaped member 56 at one end thereof. At the opposite end of the block 68, the block 68 is resiliently urged towards a shaft 70 extending upwardly from the base of the U-shaped member 56 by an O-ring 72 which acts as a spring. In this way, only the push rod 58 is directly driven.

The advantages of the above-described assemblies and method of making and utilizing same are numerous. For example, a wide variety of other-than-round electrodes may be utilized to form complex holes.

The invention has been described in an illustrative manner and it is to be understood that the terminology which has been used in intended to be in the nature of words of description rather than of limitation.

Many modifications and variations of the present invention are possible in light of the above teachings. It is, therefore, to be understood that within the scope of the appended claims, the invention may be practiced otherwise than specifically described.

What is claimed is:

1. A method of making an EDM electrode assembly including an elongated, generally straight electrode having a relatively uniform, other-than-round shape in cross-section along its entire length, having a central longitudinal axis and having an other-than-round outer peripheral surface along its entire length to form an other-than-round hole, the method comprising the steps of:

supporting the electrode in tubing having an inner diameter slightly greater than the diameter of the smallest circle enveloping all of the points of the cross-sectional shape so that an end portion of the electrode extends beyond one end of the tubing; and forming a bushing having an other-thanround inner surface complementarily formed to the outer peripheral surface of the electrode completely around the end portion of the electrode and secured to the one end of the tubing so that the electrode is slidably supported by the bushing to permit the electrode to slidably move through the tubing and through the bushing without changing its angular orientation about the longitudinal axis.

2. The method as claimed in claim 1 including the step of lubricating the end portion of the electrode prior to forming the bushing thereabout.

3. The method as claimed in claim 1 or claim 2 including the steps of:

supporting the tubing within an outer tubing;
centering the tubing in the outer tubing; and
securing the centered tubing in the outer tubing.

4. A method of refeeding an elongated, generally straight EDM electrode having a relatively uniform, other-than-round shape in cross-section along its entire length, having a central longitudinal axis and having an other-than-round outer peripheral surface along its entire length to form an other-than-round hole through tubing having an inner diameter slightly greater than the diameter of a circle enveloping all of the points of the cross-sectional shape, the electrode being housed within the tubing, the method comprising the steps of:

supporting a rod in the tubing so that the rod is aligned with the electrode and in engagement therewith at one end thereof;

driving the rod against the electrode to move the electrode along its longitudinal length; and guiding the electrode with a bushing having an other-than-round inner surface complementarily formed to the outer peripheral surface of the electrode and being secured to the one end of the tubing during said step of driving to permit the electrode to slidably move through the tubing and through the housing without changing its angular orientation about the longitudinal axis.

5. An EDM electrode assembly comprising:

an elongated, generally straight electrode having a relatively uniform, other-than-round shape in cross-section along its entire length, having a central longitudinal axis and having an other-than-round outer peripheral surface along its entire length to form an other-than-round hole;

tubing having an inner diameter slightly greater than the diameter of the circle enveloping all the points of the cross-sectional shape, said electrode being supported within said tubing so that an end portion of the electrode extends beyond one end of the tubing; and a bushing having an other-than-round inner surface complementarily formed to the outer peripheral surface of the electrode formed completely around the end portion of the electrode and secured to the one end of the tubing to slidably support the electrode to permit the electrode to slidably move through the tubing and through the bushing without changing its angular orientation about the longitudinal axis.

6. The assembly as claimed in claim 5 wherein said assembly includes an outer tubing, said tubing being supported within said outer tubing.

7. The assembly as claimed in claim 5 or claim 6 wherein said bushing comprises an epoxy bushing.

8. An EDM cartridge assembly comprising:
an elongated, generally straight electrode having a relatively uniform, other-than-round shape, in cross-section along its entire length, having a central longitudinal axis and having an other-than-round outer peripheral surface along its entire length to form an other-than-round hole;
tubing having an inner diameter slightly greater than the diameter of a circle enveloping all of the points of the cross-sectional shape, said electrode being supported within said tubing so that an end portion of the electrode extends beyond one end of the tubing;
a bushing having an other-than-round inner surface complementarily formed in the outer peripheral surface of the electrode formed around the end portion of the electrode and secured to the one end of the tubing to slidably support the electrode to permit the electrode to slidably move through the tubing and through the bushing without changing its angular orientation about the longitudinal axis;
outer tubing, said tubing being supported within said outer tubing; and
means for driving the electrode through the bushing.

9. The assembly as claimed in claim 8 wherein said means for driving includes a rod supported within the tubing and aligned with the opposite end portion of the electrode.

10. The assembly as claimed in claim 9 wherein said means for driving includes motor means in engagement with said rod for driving the rod against the electrode to move the electrode through the bushing.

* * * * *